June 20, 1967   M. A. KISE ET AL   3,326,424
METHOD AND APPARATUS FOR METERING LIQUID
Filed Jan. 3, 1964

INVENTORS
Mearl A. Kise
Robert H. Ingwall

BY *Semmes and Semmes*
ATTORNEYS

United States Patent Office 3,326,424
Patented June 20, 1967

3,326,424
METHOD AND APPARATUS FOR METERING LIQUID
Mearl A. Kise, Portsmouth, and Robert H. Ingwall, Chesapeake, Va., assignors to Virginia Chemicals & Smelting Company, West Norfolk, Va., a corporation of Virginia
Filed Jan. 3, 1964, Ser. No. 335,622
2 Claims. (Cl. 222—416)

The present application relates to a method for metering liquids, and in particular to a method and suggested device for inducing a controlled rate of feeding through a "drip feeder" of the type having a probe and capillary tube assembly.

Liquid metering devices of the type known as "drip feeders" used for conveying disinfectants are old. Once the probe or needle end of the drip feeder is inserted into the bottom of the conventional plastic bottle containing the disinfectant, it is necessary to induce the flow of disinfectant from the bottle through the probe and capillary tubing to its intended point of use. Although various means have been used to induce the flow of disinfectant, the most common method seems to be that of attaching a syringe to the end of the capillary tube closest to the point of use and pulling the plunger of the syringe slowly out, thus pulling the disinfectant from its plastic container through the probe and initiating the flow. Such a method of initiating the capillary flow involves the inconvenience of using an expensive hypodermic syringe, which might be lost. The need for a liquid metering device or "drip feeder" with a built-in suction means for initiating the flow of solution or disinfectant has been of long standing.

The present invention concerns a method of dripping a first liquid from a container comprising the steps of (1) Filling a tube with a second liquid,
(2) Sealing the ends of the tube,
(3) Introducing the upper end of the tube into said container,
(4) Breaking the sealing on the lower end of the tube while permitting the second liquid to drop therefrom, thus creating a vacuum in the tube, and
(5) Drawing the first liquid into and through the tube by said vacuum.

The suggested device for performing this method consists of a liquid metering device including a "factory-filled" capillary tube assembly containing colored water throughout its entire length. During shipment, the liquid metering device, which consists of the capillary tube and probe which is attached thereto, is sealed at both ends. In its preferred form the capillary tubing is sealed at one end with a heat seal while the apertures of the probe are closed with conventional sealing tape. When ready for use, the sealing tape is removed from the probe and the forward or tapered portion of the probe inserted into the solution containing plastic container. Thereafter, the delivery end of the capillary tubing is severed, thus initiating the flow of liquid therethrough. It is this flow of liquid which provides the necessary suction force to initiate the flow of disinfectant from the container to the probe and capillary tubing. Thus, the necessity of using an additional piece of equipment such as a syringe is avoided and the expense and inconvenience of the operation diminished.

Accordingly, it is an object of the present invention to provide a method for inducing a flow of solution from a container to a liquid metering device without the use of a separate piece of apparatus.

Another object is to provide a liquid metering device with a "built-in" means for initiating the flow of liquid therethrough consisting of a "factory-filled" water-containing capillary tube.

Yet, additional objects of invention will become apparent from the ensuing specification and attached drawings wherein.

Figure 1:
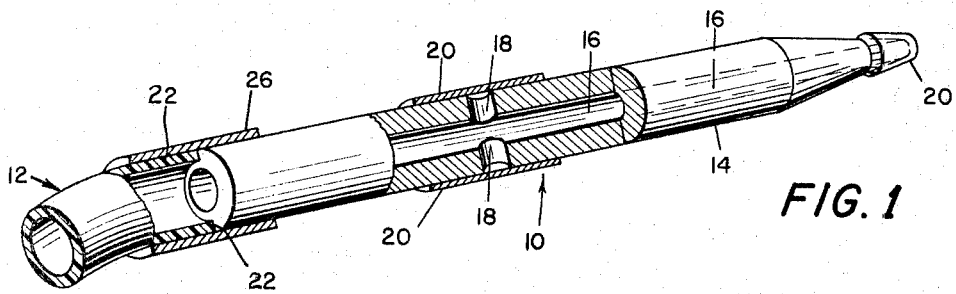
FIG. 1 is a perspective view of a suggested liquid metering device showing the details of the probe and capillary tube assembly with the passages of the probe sealed.
Figure 2:
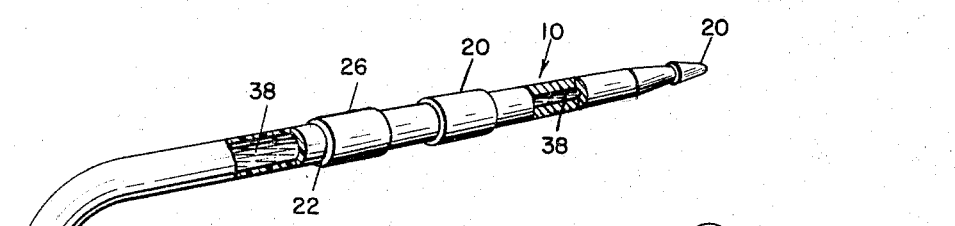
FIG. 2 is a perspective view of the liquid metering device before installation showing both the probe and discharge end of the capillary tubing sealed.

As seen in FIGS. 1 and 2, the liquid metering device as here disclosed consists of a probe 10, one end of which is used to pierce a solution-filled plastic container 32, and a length of capillary tubing 12 which is attached to the other end of probe 10.

Probe 10 consists of a tapered-cut, open-end, steel portion 14, containing an axial passage 16 which provides communication between the plastic container 32 and the capillary tubing 12. Probe 10 also contains two side-entrance passages 18 which permit solution from container 32 to enter passage 16 in case a piece of plastic becomes embedded in the tip of passage 16. As seen in FIG. 1, sealing tape 20 is wrapped around the tip of probe 10 and that portion of the probe adjacent passages 18 to prevent the liquid contained in capillary tubing 12 from draining out.

The capillary tubing 12 consists of 15 feet of polyethylene tubing having a receiving end 22 which is connected to the left end of probe 10 by means of attaching a retaining member 26, which may consist of a 3/4-inch section of Tygon tubing. At the delivery end 24 of the capillary tubing 12 is located heat seal 30 which prevents the passage of liquid therethrough until it is desired to initiate the operation of the liquid metering device.

At the factory, capillary tubing 12 is filled with a liquid 38 which preferably consists of de-aerated water containing a small amount of methylene blue dye. After the probe 10 is inserted within the receiving end 22 of capillary tubing 12, the passages 18 and the tip of probe 10 are sealed with conventional sealing tape 20. Finally, the discharge end 24 of capillary tubing 12 is closed with a heat seal 30 and the tubing coiled and fastened with straps 28.

Figure 3:
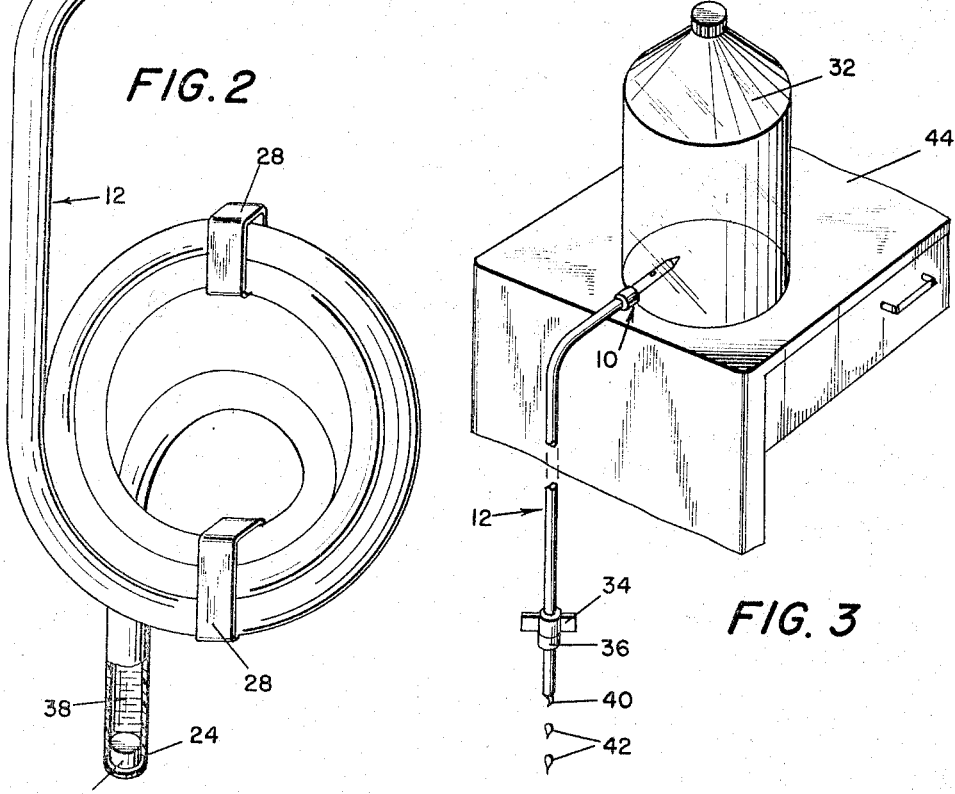
FIG. 3 is a perspective view of the liquid metering device in use with its probe inserted near the bottom of a solution-filled plastic bottle.

Upon arrival at its intended place of use, sealing tape 20 is removed from probe 10 and the forward or piercing portion of probe 10 inserted within the side wall of solution container 32 as seen in FIG. 3. Capillary tubing 12 is then uncoiled to its desired length by unfastening straps 28. The height of the receiving end 22 of capillary tubing 12 above its delivery end 24 determines the rate of delivery of solution. A lead weight 34, weighing approximately 1 1/4 ounces is attached to the capillary tubing about four inches above its delivery end 24 and held in place with a retainer 36 which consists of a piece of Tygon tubing. Flow control may also be regulated by varying the temperature of solution within container 32.

When ready for use, the discharge end 24 of capillary tubing 12 containing the heat seal 30 is snipped off this initiating the flow of water through the capillary tube 12. This flow of water in turn creates a suction effect which initiates the movement of solution from the container 32 to the probe 10 and down capillary tube 12 to the point of use. If, as a result of piercing the side of plastic container 32, the forward portion of passage 16 of probe 10 becomes clogged, the solution from container 32 will enter the rear portion of passage 16 through passages 18, thus by-passing the clogged portion of passage 16. As can readily be seen, the suction effect caused by the initial passage of water down capillary tube 12 eliminates the necessity of using a separate suction-creating apparatus such as a syringe to initiate the flow of solution.

The operation of the liquid metering device is illustrated in FIG. 3 which shows probe 10 inserted into the side wall of the solution-filled plastic container 32 which rests on support member 44. At the bottom of capillary tube 12 can be seen drops of solution 40, 42.

Manifestly, interchange of parts and reconfiguration thereof may be employed without departing from the scope of invention, as defined in the subjoined claims.

We claim:
1. A metering device with means for inducing controlled rate of feeding therefrom, comprising:
   (A) a container enclosing solution desired to be metered, said container capable of being punctured;
   (B) a probe for insertion within said container, said probe consisting of a cylindrical body portion and an end portion tapering inwardly thereof to define a tip, said cylindrical and tapering portions containing an axial passageway extending throughout the entire length of said probe and terminating in a first opening at said tip, together with secondary passage means located within said cylindrical portion in communication with said axial passageway and terminating in at least one second opening along the outside of said cylindrical portion;
   (C) a capillary tube having a receiving end and a discharge end with opening, said receiving end attached to said cylindrical portion of said probe and in communication with said axial passageway contained therein;
   (D) first removable sealing means attached to said probe so as to block said first opening of said axial passageway at said tip as well as said second opening of said cylindrical portion;
   (E) second movable sealing means attached to said discharge end of said capillary tube so as to block said opening of said discharge end; and
   (F) a liquid other than said solution contained within said capillary tube, such that after said first sealing means is removed and said probe is inserted within said container and said second sealing means is removed, the downward passage of said liquid through said capillary tube induces subsequent passage of solution from said container downwardly through said capillary tube to intended point of use.

2. A metering device as in claim 1, wherein said liquid is de-aerated water.

References Cited
UNITED STATES PATENTS

| | | | |
|---|---|---|---|
| 1,524,833 | 2/1925 | McCracken | 137—142 |
| 1,575,152 | 3/1926 | Battista | 222—146 |
| 1,915,403 | 6/1933 | Clark | 137—146 |
| 2,851,403 | 9/1958 | Poitras et al. | 222—416 X |
| 2,934,915 | 5/1960 | Morse | 66—77 X |
| 3,001,525 | 9/1961 | Hendricks | 128—214 |
| 3,081,002 | 3/1963 | Tauschinski et al. | 222—181 |

OTHER REFERENCES

Duff, A. W.: A Textbook of Physics, Philadelphia, The Blakiston Co., 1908, Section 234, The Siphon, page 170.

ROBERT B. REEVES, *Primary Examiner.*

LOUIS J. DEMBO, *Examiner.*

F. R. HANDREN, *Assistant Examiner.*